United States Patent [19]

Asai et al.

[11] Patent Number: 4,495,878
[45] Date of Patent: Jan. 29, 1985

[54] ELECTRONIC SEWING MACHINE

[75] Inventors: Yoshimi Asai; Michitaka Takiguchi; Fujio Horie, all of Nagoya, Japan

[73] Assignee: Brother Kogyo Kabushiki Kaisha, Nagoya, Japan

[21] Appl. No.: 494,681

[22] Filed: May 16, 1983

[30] Foreign Application Priority Data

Jun. 1, 1982 [JP] Japan .................................. 57-93657

[51] Int. Cl.³ .............................................. D05B 3/08
[52] U.S. Cl. ............................. 112/158 B; 112/158 E; 112/264.1
[58] Field of Search ............ 112/158 B, 158 E, 158 F, 112/121.11, 121.12, 65, 66, 264.1

[56] References Cited

U.S. PATENT DOCUMENTS 4,191,121  3/1980  Eguchi ........................ 112/158 E X
4,331,089  5/1982  Widmer ...................... 112/158 E X
4,370,938  2/1983  Bergvall ......................... 112/158 E Primary Examiner—Peter Nerbun
Attorney, Agent, or Firm—Browdy and Neimark

[57] ABSTRACT

An electronic sewing machine capable of forming a buttonhole having a circular stitching part. The machine has manually operated members for setting thread thickness and button size. A stitch data generator is provided, which is capable of selectively generating one of plural different groups of stitch data for forming different buttonholes which have a different number of stitches at their circular stitching part. The specific group of stitch data is selected according to code signals fed in accordance with the positions of the manually operated members. The position of each stitch contained in the circular stitching part of the buttonhole is determined by each stitch data of the selected group. Thus, the desired buttonhole is sewn neatly without crowded or lean stitches.

6 Claims, 7 Drawing Figures

ELECTRONIC SEWING MACHINE

BACKGROUND OF THE INVENTION

The present invention relates to a sewing machine capable of sewing buttonholes, particularly eyelet-end buttonholes or the like having a circular stitching part.

In sewing an eyelet-end buttonhole, it is preferred that its circular stitching part be formed with a proper density of stitches or without excess or deficiency of stitches, i.e., a constant thread density so as to give a neat, beautiful appearance. In a buttonhole sewing machine known in the art, however, the number of stitches formed in the circular stitching part of a buttonhole is limited. This limitation has presented a drawback that a change in thickness of a thread to be used will cause a variation in density of stitches in such circular stitching part, i.e., the use of a thick thread will cause the stitches to be too close together while the use of a fine thread will cause the stitching part to appear scanty of stitches.

In a sewing machine using cams adapted to form various stitching patterns, on the other hand, it is possible to utilize such cams of different profiles depending upon specific thicknesses of threads and sizes of buttonholes in order to form a circular stitching part of the buttonhole having a neat appearance with a proper stitch density. In this instance, the formation of different patterns of buttonholes will require time-consuming and cumbersome changeover as well as preparation of many different cams, thereby providing another drawback of increased cost and reduced efficiency of buttonhole sewing.

SUMMARY OF THE INVENTION

It is accordingly an object of the present invention to provide an electronic sewing machine with a buttonhole sewing capability, which permits neat formation of stitches in a circular stitching part of an eyelet-end buttonhole or the like with a constant thread density irrespective of a thickness of a thread to be used.

According to the present invention, there is provided an electronic sewing machine having actuating means for varying a relative position of a needle and a workpiece in accordance with stitch data which influences each stitch of a buttonhole. The machine comprises: manually operated means for setting a thickness of a thread; means for generating a thread code signal representative of the thread thickness set by the manually operated means; means responsive to the thread code signal for designating one of plural predetermined buttonholes each of which has a circular stitching part at its end, the buttonholes being different in the number of stitches to be formed in the circular stitching part; and data generating means capable of selectively generating one of plural different groups of stitch data which respectively correspond to the plural buttonholes, the data generating means operating in timed relation with reciprocation of the needle for supplying the actuating means with each stitch data of the group corresponding to the designated buttonhole.

In an electronic sewing machine constructed as described above according to the invention, the designating means designates, according to a thread thickness represented by a thread code signal from the thread code signal generating means, one of plural different groups of stitch data, and the data generating means supplies the actuating means with each stitch data of the designated group. The different groups of stitch data correspond to buttonholes which have different numbers of stitches to be formed in their circular stitching part. Therefore, the circular stitching part of each buttonhole is sewn with a proper number of stitches that suits the selected thread thickness and thus provided with a constant thread density, and a heat appearance without excess or deficiency of stitches. The arrangement of the invention also completely eliminates the need of preparing and changing many different cams which reduces the sewing efficiency.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF THE PREFERRED EMBODIMENTS

Figure 1:
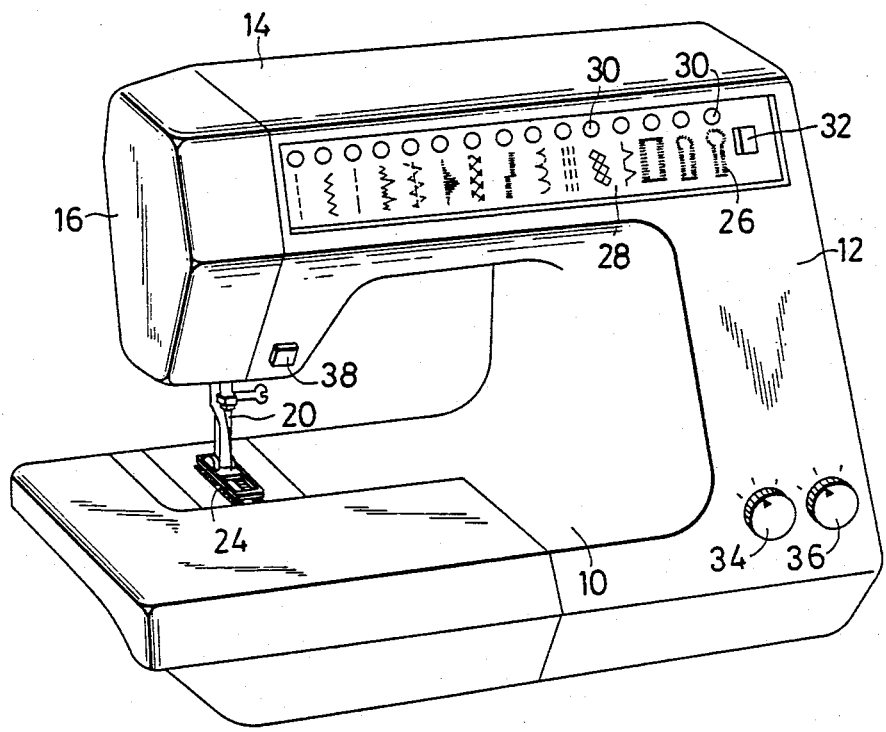
FIG. 1 is a view in perspective of one embodiment of an electronic sewing machine of the invention capable of sewing buttonholes.

Referring to the accompanying drawings, there is shown in FIG. 1 an electronic sewing machine having a bed 10 from which rises a standard 12. The machine further has a horizontally extending bracket arm 14 which is supported at its one end by the standard 12. The bracket arm 14 terminates in a head 16 which carries at its lower part a needle 20 which is reciprocated endwise or vertically in timed relation with movements of a machine spindle not shown. The needle 20 is oscillated or jogged laterally or sidewise by a bight actuator 18 described later. On a portion of the bed 10 adjacent to the lowered position of the needle 20, there is provided a feed dog 24 for feeding a workpiece, direction and amount of feed thereof being determined by a feed actuator 22 which is also described later. The needle 20 and the feed dog 24 cooperate to form a desired stitch pattern on the workpiece The bracket arm 14 has on its front surface a display plate 28 bearing a multiplicity of pattern indicia 26, a pattern indicator 30 consisting of plural light emitting diodes (LEDs) located adjacent and corresponding to the pattern indicia 26, and a pattern selecting button 32 each depression of which causes the illuminated LED to be moved one position, thereby allowing selection of a desired stitch pattern. Further, there are disposed on the lower front surface of the standard 12 two manually operated control members: a thread thickness selecting dial 34 for designating a thickness of a thread to be used in a specific sewing, and a button size selecting dial 36 for designating a size of a button which corresponds to a buttonhole to be formed. On the lower front surface of the head 16, is provided a start-stop button 38 of alternate-action type whose depressions cause the sewing machine to be started and stopped alternately.

Figure 2:
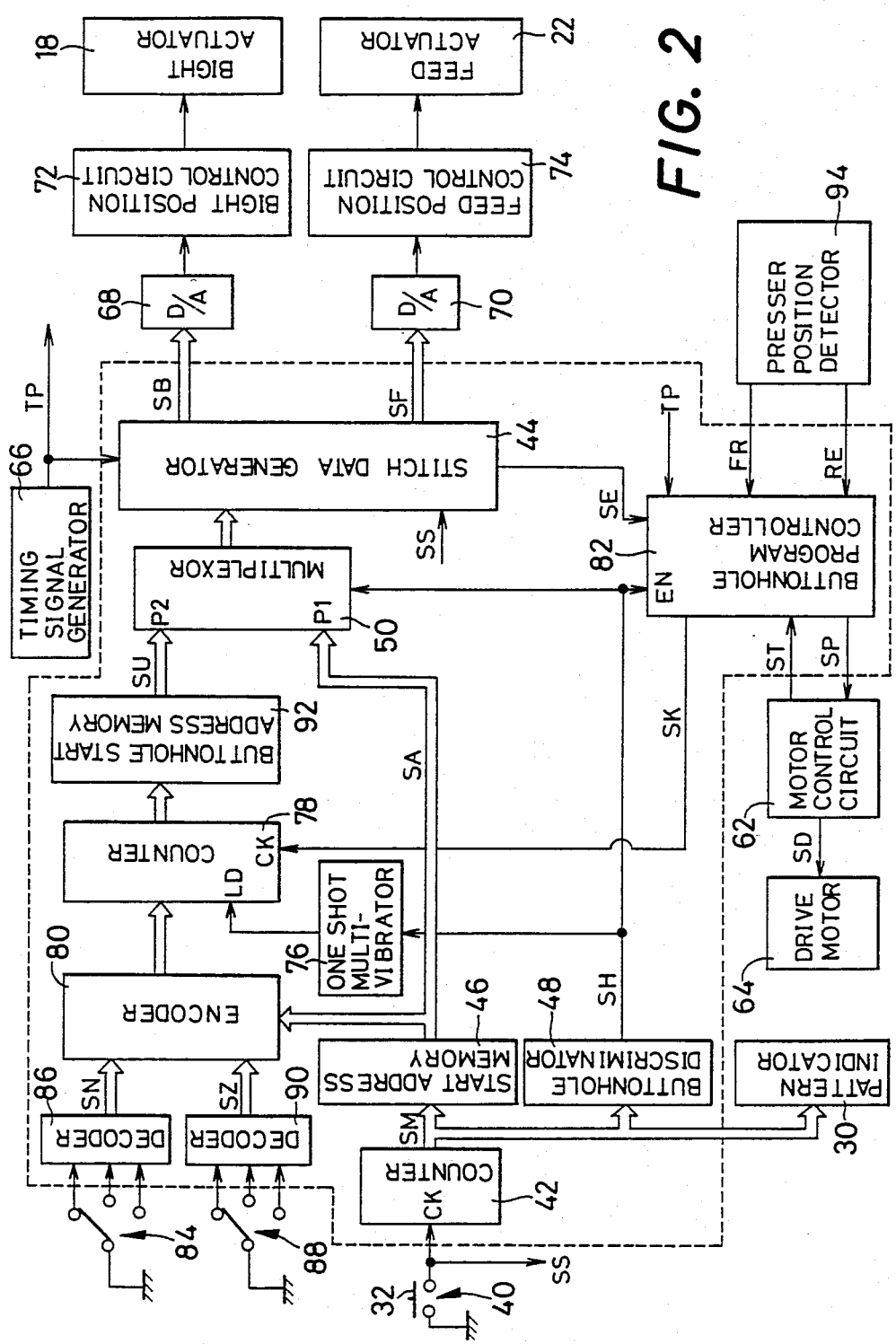
FIG. 2 is a schematic block diagram showing a control circuit for the sewing machine of FIG. 1.

Referring next to FIG. 2 which provides a schematic block diagram showing a control circuit for the sewing machine described above, there is shown a switch 40 which, upon each depression of the pattern selecting button 32, is closed feeding a SELECT OPERATION signal SS to a counter 42 and a stitch data generator 44. The counter 42 counts the SELECT OPERATION signal SS and generates according to its count a PATTERN CODE signal SM representative of a selected stitch pattern, which signal SM is sent to a start address memory 46 and a buttonhole discriminator 48. The signal SM is also fed to the pattern indicator 30 to illuminate the LED which corresponds to the indicium 26 of the selected stitch pattern. When the selected stitch pattern is not a pattern of a buttonhole having a circular stitching part, no DISCRIMINATION signal SH is generated from the buttonhole discriminator 48 and consequently a multiplexor 50 selects its input port P1. As a result, a START ADDRESS signal SA corresponding to the PATTERN CODE signal SM is supplied to the stitch data generator 44 through the multiplexor 50.

Figure 3:
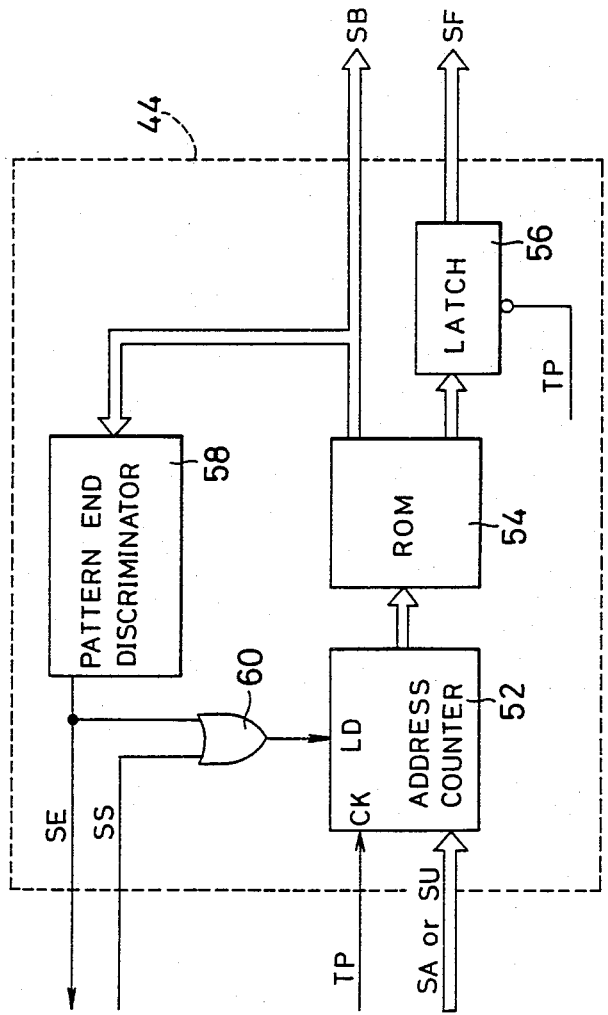
FIG. 3 is a schematic block diagram showing a composition of a stitch data generator incorporated in the control circuit of FIG. 2.

The stitch data generator 44 comprises, as illustrated in FIG. 3, an address counter 52, ROM (read-only memory) 54, a latch 56, a pattern end discriminator 58, and an OR gate 60. The ROM 54 stores plural groups of stitch data representative of stitch positions, and the groups correspond to plural stitch patterns available. Those groups of stitch data includes the groups of stitch data listed in Tables 1 through 3 referred to later.

A switch which is closed through depression of the start-stop button 38, is included in a motor control circuit 62. Upon depression of the start-stop switch 38, a DRIVE signal SD is fed from the motor control circuit 62 to a drive motor 64 whereby the machine spindle (not shown) is driven. A timing pulse generator 66 feeds a TIMING signal TP to the stitch data generator in synchronization with the rotation of the machine spindle, and therefore the address counter 52 which has been loaded with the START ADDESS signal SA upon generation of the SELECT OPERATION signal SS, adds the TIMING signal TP to its load or content and supplies the ROM 54 with its total count which designates an address in the ROM 54. According to the designated address, the ROM 54 provides an output of stitch data consisting of BIGHT data SB representing a lateral position of the needle 20, and FEED data SF representing a direction and an amount of feed of the workpiece. The output of the FEED data SF from the ROM 54 is latched by a latch 56 which temporarily stores the data SF upon falling of the TIMING signal TP, whereby there exists a phase difference of substantially half cycle between the output of the data SF and that of the data SB.

The BIGHT data SB and the FEED data SF are convered into analogue (voltage) signals by digital-analogue converters 68 and 70, respectively, and the analogue signals are fed to a drive control device, i.e., a bight position control circuit 72 and a feed position control circuit 74. The control circuit 72 supplies the bight actuator 18 with a drive power corresponding to the BIGHT data SB in order to determine a lateral or bight position of the needle 20, and the control circuit 72 supplies the feed actuator 22 with a drive power corresponding to the FEED data SF to determine feeding direction and amount of the feed dog 24. Thus, a stitch position is determined upon each generation of each set of stitch data.

When all sets of stitch data, that is, a group of stitch data for one selected pattern have been executed, end data at the end of the stitch data is detected by a pattern end discriminator 58 which feeds an END CODE signal SE through the OR gate 60 to the address counter 52. The address counter 52 is again loaded with the START ADDRESS signal SA corresponding to the selected pattern, and the operation stated above is repeated. In this manner, the selected stitch pattern is formed repeatedly.

Upon selection, by the pattern selecting button 32, of a pattern of a buttonhole having a circular stitching part, the buttonhole discriminator 48 generates a DISCRIMINATION signal SH which is fed through a one-shot multi-vibrator 76 to a counter 78. The signal SH causes the counter 78 to be loaded with an output signal from an encoder 80. In the meantime, the DISCRIMINATION signal SH is fed to a buttonhole program controller 82 to enable the same, and to the multiplexer 50 to select its input port P2.

A switch 84 which is operated in response to the manipulation of the thread thickness selecting dial 34, is connected to a decoder 86 which provides the encoder 80 with THREAD CODE signal SN representative of a thread thickness corresponding to the current position of the thread thickness selecting dial 34. Thus, the decoder 86 provides means for generating the THREAD CODE signal SN. Similarly, a switch 88 which is operated in response to the maninulation of the button size selecting dial 36, is connected to a decoder 90 which provides the encoder 80 with SIZE CODE signal SZ representative of a button size corresponding to the current position of the selecting dial 36. Thus, the decoder 90 provides means for generating the SIZE CODE signal SZ. The encoder 80 which has already been provided with the START ADDRESS signal SA corresponding to the previously selected buttonhole pattern, supplies the counter 78 with code signals representing thread thickness, button size and buttonhole pattern according to the THREAD CODE, SIZE CODE and START ADDRESS signals SN, SZ and SA, so as to cause the stitch data generator 44 to generate a group of stitch data for sewing a buttonhole pattern represented by those code signals. Stated differently, the encoder 80 constitutes a circuit which is responsive to the signals SN, SZ and SA and selects one of plural different groups of stitch data corresponding to the respective buttonhole patterns available.

A signal representing a count of the counter 78 is fed to a buttonhole start address memory 92 which in turn feeds a START ADDRESS signal SU to the stitch data generator 44 through the multiplexer 50. The START ADDRESS signal SU corresponds to each stitching part of the buttonhole pattern. The buttonhole program controller 82 receive from a presser position detector 94 a FRONT EDGE signal FR which represents that the needle 20 is located at the front end (on the operator's side) of the buttonhole pattern to be sewn, and a REAR EDGE signal RE which represents that the needle 20 is located at the rear end (on the rear side) of the buttonhole pattern (on the side toward which the fabric is fed). Further, the buttonhole program controller 82 generates at appropriate timings a SEQUENCE signal SK based on the FRONT EDGE, REAR EDGE and TIMING signals FR, RE, and TP, which signal SK is fed to the counter 78 in order to advance or increment the count thereof and thereby cause the buttonhole start address memory 92 to sequentially generate the START ADDRESS signals SU corresponding to the individual stitching parts of the buttonhole pattern. The presser position detector 94 referred to above is a well-known device built in the head 16 for actuating a limit switch or other switching element by utilizing a relative movement between a work engaging shoe of a buttonhole presser foot (used for buttonhole sewing) and the head 16, and thereby generating the FRONT EDGE and REAR EDGE signals FR and RE.

Upon depression of the start-stop button 38 in the above condition, the drive motor 64 is started to rotate the machine spindle, and the motor control circuit 62 supplies the buttonhole program controller 82 with a MOTOR START signal ST which permits a sequential operation of the controller 82.

Figure 4:
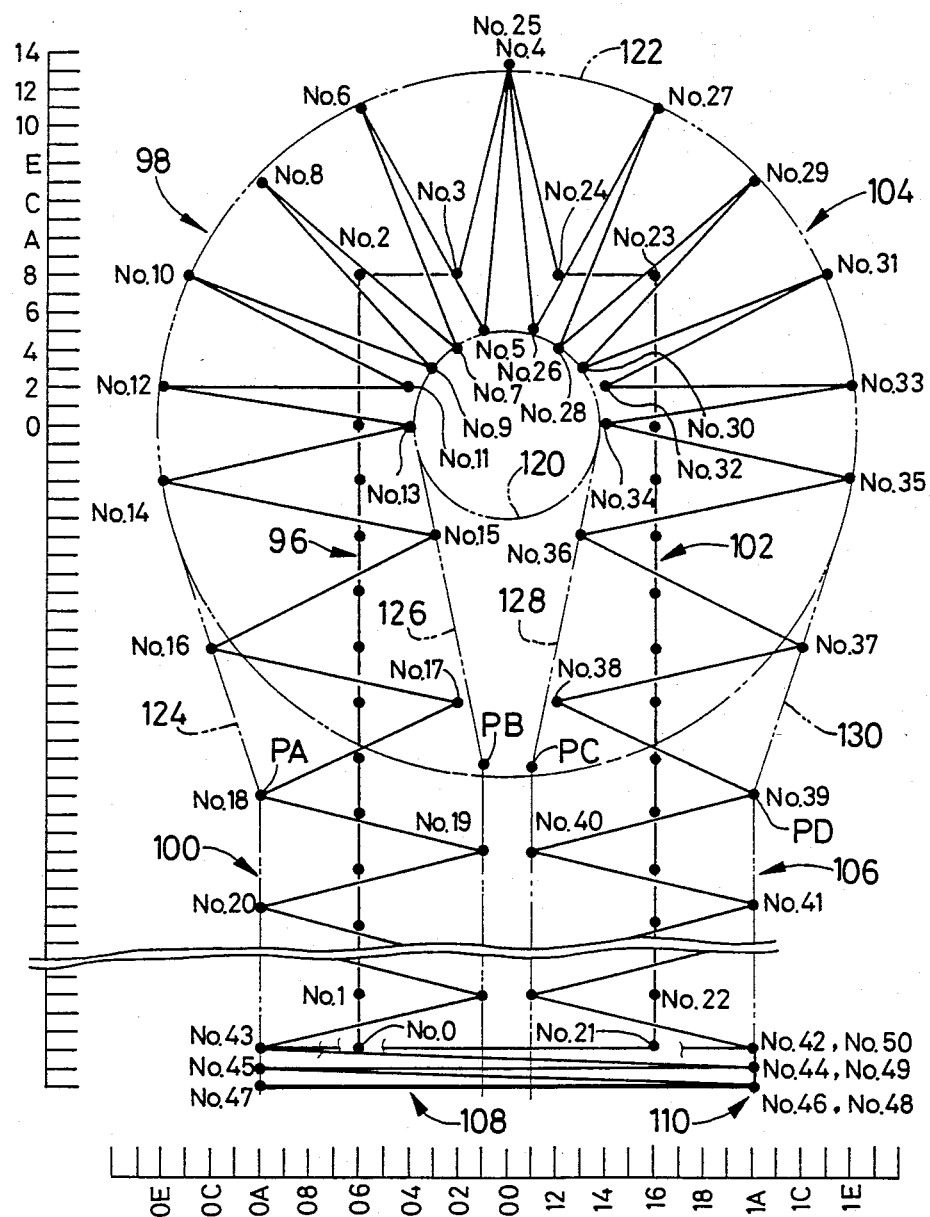
FIG. 4 is a diagrammatic view illustrating a stitch pattern of a buttonhole sewn with a thick thread on the machine of FIG. 1.

In the event, for example, the buttonhole pattern represented at the extreme right-hand side position on the display plate 26 of FIG. 1 is selected by the pattern selecting button 32 and a thick thread is designated by the thread thickness selecting dial 34, the first turn of the machine spindle will trigger the stitch data generator 44 to generate a stitch data No. 0 indicated in Table 1, and a stitch No. 0 shown in FIG. 4 is formed according to the generated stitch data No. 0. After the formation of the stitch No. 0, the SEQUENCE signal SK is supplied from the buttonhole program controller 82 to the counter 78 to add one to its count. As a result, the START ADDRESS signal SU representing a new start address is fed from the buttonhole start address memory 92 to the stitch data generator 44 which in turn generates a new stitch data No. 1 in Table 1. This stitch data No. 1 is repeatedly generated from the generator 44 in synchronization with the rotation of the machine spindle until the REAR EDGE signal RE is given to the buttonhole program controller 82. Thus, a left-side straight stitching part 96 is formed, i.e., a line of straight stitches 96 is formed on the left side of the buttonhole, as shown in FIG. 4.

TABLE 1

| No. | SB | SF |
|---|---|---|
| 0 | 06 | 00 |
| 1 | 06 | 03 |
| 2 | 06 | 07 |
| 3 | 02 | 00 |
| 4 | 00 | 0B |
| 5 | 01 | 1D |
| 6 | 06 | 0B |
| 7 | 02 | 1C |
| 8 | 0B | 08 |
| 9 | 03 | 19 |
| 10 | 0E | 04 |
| 11 | 04 | 15 |
| 12 | 0F | 00 |
| 13 | 04 | 12 |
| 14 | 0F | 13 |
| 15 | 03 | 13 |
| 16 | 0D | 16 |
| 17 | 02 | 12 |
| 18 | 0B | 15 |
| 19 | 01 | 13 |
| 20 | 0B | 13 |
| 21 | 16 | 00 |
| 22 | 16 | 03 |
| 23 | 16 | 07 |
| 24 | 12 | 00 |
| 25 | 00 | 0B |
| 26 | 11 | 1D |
| 27 | 16 | 0B |

TABLE 1-continued

| No. | SB | SF |
|---|---|---|
| 28 | 12 | 1C |
| 29 | 1B | 08 |
| 30 | 13 | 19 |
| 31 | 1E | 04 |
| 32 | 14 | 15 |
| 33 | 1F | 00 |
| 34 | 14 | 12 |
| 35 | 1F | 13 |
| 36 | 13 | 13 |
| 37 | 1D | 16 |
| 38 | 12 | 12 |
| 39 | 1B | 15 |
| 40 | 11 | 13 |
| 41 | 1B | 13 |
| 42 | 1B | 00 |
| 43 | 0B | 00 |
| 44 | 1B | 00 |
| 45 | 0B | 00 |
| 46 | 1B | 00 |
| 47 | 0B | 00 |
| 48 | 1B | 00 |
| 49 | 1B | 01 |
| 50 | 1B | 01 |

TABLE 2

| No. | SB | SF |
|---|---|---|
| 0 | 06 | 00 |
| 1 | 06 | 03 |
| 2 | 06 | 07 |
| 3 | 01 | 00 |
| 4 | 00 | 0B |
| 5 | 01 | 0D |
| 6 | 04 | 0C |
| 7 | 02 | 1D |
| 8 | 08 | 0B |
| 9 | 03 | 1C |
| 10 | 0B | 09 |
| 11 | 04 | 1A |
| 12 | 0E | 05 |
| 13 | 04 | 16 |
| 14 | 0F | 02 |
| 15 | 04 | 13 |
| 16 | 0F | 11 |
| 17 | 03 | 13 |
| 18 | 0E | 13 |
| 19 | 02 | 13 |
| 20 | 0C | 13 |
| 21 | 01 | 13 |
| 22 | 0B | 13 |
| 23 | 01 | 13 |
| 24 | 16 | 00 |
| 25 | 16 | 03 |
| 26 | 16 | 07 |
| 27 | 11 | 00 |
| 28 | 00 | 0B |
| 29 | 11 | 1D |
| 30 | 14 | 0C |
| 31 | 12 | 1D |
| 32 | 18 | 0B |
| 33 | 13 | 1C |
| 34 | 1B | 09 |
| 35 | 14 | 1A |
| 36 | 1E | 05 |
| 37 | 14 | 16 |
| 38 | 1F | 02 |
| 39 | 14 | 13 |
| 40 | 1F | 11 |
| 41 | 13 | 13 |
| 42 | 12 | 13 |
| 43 | 12 | 13 |
| 44 | 1C | 13 |
| 45 | 11 | 13 |
| 46 | 1B | 13 |
| 47 | 11 | 13 |
| 48 | 1B | 00 |
| 49 | 0B | 00 |
| 50 | 1B | 00 |
| 51 | 0B | 00 |

TABLE 2-continued

| No. | SB | SF |
| --- | --- | --- |
| 52 | 1B | 00 |
| 53 | 0B | 00 |
| 54 | 1B | 00 |
| 55 | 1B | 01 |
| 56 | 1B | 01 |

TABLE 3

| No. | SB | SF |
| --- | --- | --- |
| 0 | 06 | 00 |
| 1 | 06 | 03 |
| 2 | 06 | 07 |
| 3 | 02 | 00 |
| 4 | 00 | 0B |
| 5 | 01 | 1D |
| 6 | 03 | 0C |
| 7 | 02 | 1C |
| 8 | 06 | 0B |
| 9 | 03 | 1C |
| 10 | 09 | 0A |
| 11 | 04 | 1B |
| 12 | 0C | 08 |
| 13 | 04 | 19 |
| 14 | 0E | 05 |
| 15 | 04 | 16 |
| 16 | 0F | 02 |
| 17 | 04 | 14 |
| 18 | 0F | 00 |
| 19 | 03 | 14 |
| 20 | 0E | 11 |
| 21 | 02 | 13 |
| 22 | 0D | 13 |
| 23 | 01 | 13 |
| 24 | 0B | 13 |
| 25 | 01 | 13 |
| 26 | 0B | 13 |
| 27 | 16 | 00 |
| 28 | 16 | 03 |
| 29 | 16 | 07 |
| 30 | 12 | 00 |
| 31 | 00 | 0B |
| 32 | 11 | 1D |
| 33 | 13 | 0C |
| 34 | 12 | 1C |
| 35 | 16 | 0B |
| 36 | 13 | 1C |
| 37 | 19 | 0A |
| 38 | 14 | 1B |
| 39 | 1C | 08 |
| 40 | 14 | 19 |
| 41 | 1E | 05 |
| 42 | 14 | 16 |
| 43 | 1F | 02 |
| 44 | 14 | 14 |
| 45 | 1F | 00 |
| 46 | 13 | 14 |
| 47 | 1E | 11 |
| 48 | 12 | 13 |
| 49 | 1D | 13 |
| 50 | 11 | 13 |
| 51 | 1B | 13 |
| 52 | 11 | 13 |
| 53 | 1B | 13 |
| 54 | 1B | 00 |
| 55 | 0B | 00 |
| 56 | 1B | 00 |
| 57 | 0B | 00 |
| 58 | 1B | 00 |
| 59 | 0B | 00 |
| 60 | 1B | 00 |
| 61 | 1B | 01 |
| 62 | 1B | 01 |

Upon the REAR EDGE signal RE applied to the buttonhole program controller 82, the SEQUENCE signal SK is fed from the controller 82 to the counter 78 and therefore another START ADDRESS signal SU is supplied to the stitch data generator 44 in the same manner as previously stated. Accordingly, successive stitch data Nos. 2 through 18 of Table 1 are sequentially generated and a left semicircular stitching part 98 is formed as shown in FIG. 4. The buttonhole program controller 82 counts the TIMING signal TP and generates again the SEQUENCE signal SK when the count has reached a predetermined number (17 in this embodiment). The signal SK received by the counter 78 causes another START ADDRESS signal SU to be supplied to the stitch data generator 44, thereby triggering the generator 44 to generate the following two stitch data Nos. 19 and 20 alternately in a repeated fashion. In consequence, a left side zigzag stitching part 100 is formed, i.e., a line of cording stitches Nos. 19, 20 is formed on a straight part 96 on the left side of the buttonhole, as shown in FIG. 4.

While the left side zigzag stitching part 100 is formed, the FRONT EDGE signal FR is generated and fed to the buttonhole program controller 82, whereby another SEQUENCE signal SK is fed to the counter 78 and as a result, the generator 44 provides a next stitch data No. 21 which creates a stitch No. 21 shown in FIG. 4. Successively, another SEQUENCE signal SK from the controller 82 is received by the counter 78, and another START ADDRESS signal SU is supplied, in the same manner as previously described, to the generator 44 which then outputs a next stitch data No. 22. This stitch data No. 22 is repeatedly generated until the REAR EDGE signal RE is generated, so that a right side straight stitching part 102 (a line of straight stitches) is formed as illustrated in FIG. 4. Again, the buttonhole program controller 82 counts the TIMING signal TP, and consequently the following successive stitch data Nos. 23 through 39 are generated during a counting operation of the counter 82 which continues until its count has reached a predetermined number (17 in this embodiment). Those stitch data Nos. 23 through 39 create a right semicircular stitching part 104. Subsequently, stitch data 40 and 41 are alternately and repeatedly generated to form a right side zigzag stitching part 106 (a line of cording stitches Nos. 40 and 41 on the right side). Then, the next SEQUENCE signal SK is supplied from the controller 82 to the counter 78, which causes the generator 44 to output the following stitch data Nos. 42 through 47, whereby a bar tacking part 108 is formed according to those stitch data.

In the meantime, the buttonhole program controller 82 counts the TIMING signal TP until its count has reached a predetermined number (6 in this embodiment). When the predetermined number of the TIMING signals TP has been counted, the controller 82 supplies the counter 78 with the SEQUENCE SIGNAL SK which causes the generator 44 to provide next stitch data Nos. 48 through 50 so that a back stitching part 110 is formed.

The buttonhole pattern represented in FIG. 4 is formed in the manner as described hereinbefore. At the end of the pattern formation, end data stored together with the last stitch data No. 50 is detected by the pattern end discriminator 58 which applies the END CODE signal SE to the buttonhole program controller 82 as soon as the end data has been detected. The controller 82 which has received the END CODE signal SE, supplies the motor control circuit 62 with a MOTOR STOP signal SP which stops the drive motor 64. It is noted that the numbers located adjacent to dots in FIG.

4 represent stitches which are formed from the respective stitch data numbered in Table 1.

Figure 5:
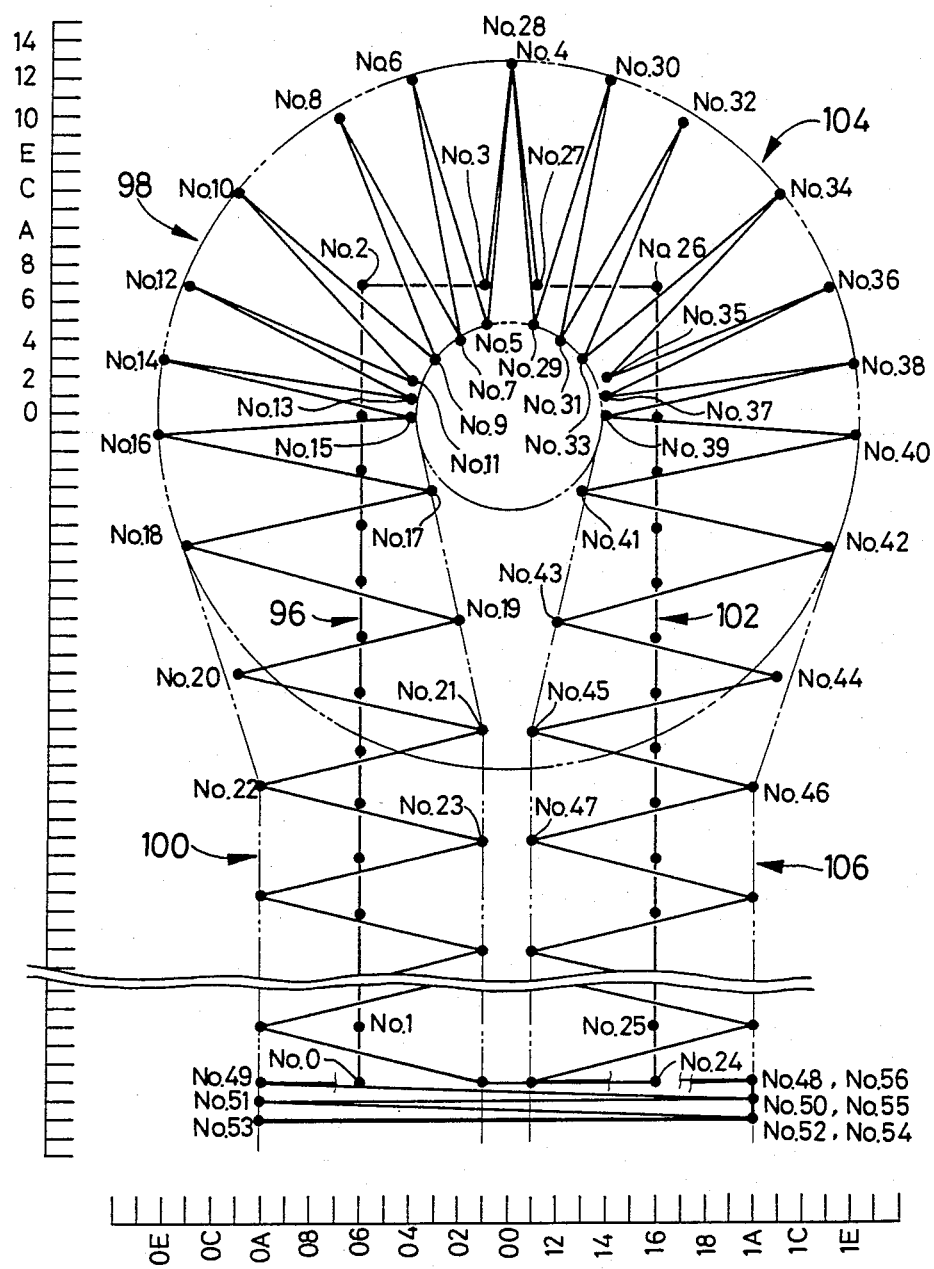
FIGS. 5 and 6 are views, corresponding to FIG. 4, of stitch pattern of buttonholes sewn with medium and fine threads.

Next, the description refers to the operation when a thread of medium thickness is selected by the thread thickness selecting dial 34. In this instance, the THREAD CODE signal SN representing the selected thread thickness is supplied to the encoder 80 which then supplies the counter 78 with a signal to select that group of stitch data which permits a circular stitching part of a buttonhole pattern to be formed neatly with a thread of medium thickness. In other words, the group of stitch data indicated in Table 2 is selected and stitch data are sequentially generated from the stitch data generator 44 while the output are controlled by the buttonhole program controller 82 in the same way as previously discussed. As a result, a buttonhole pattern shown in FIG. 5 is formed. The left and right semicircular stitching parts 98 and 104 in this pattern, have a greater number of stitches than those of the pattern of FIG. 4. In other words, the number of stitches in the circular stitching part of FIG. 5 is increased to maintain a constant density of stitches.

Figure 6:
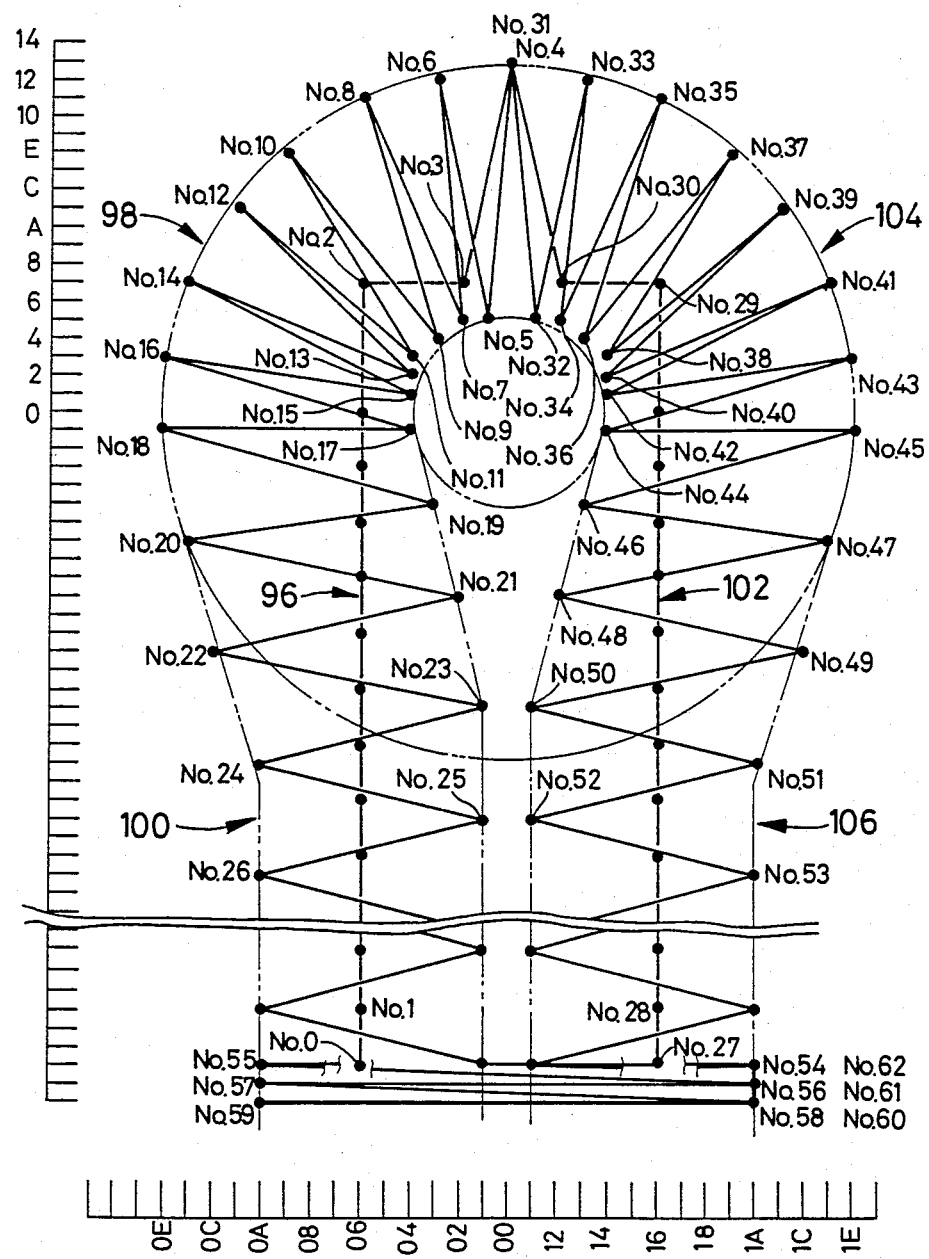

Similarly, when a fine thread is selected by the thread thickness selecting dial 34, a group of stitch data given in Table 3 is selected and stitch data are gnerated from the generator 44 under control of the buttonhole program controller 82, whereby a buttonhole pattern shown in FIG. 6 is formed. In this case, the number of stitches contained in the semicircular stitching parts 98 and 104 is further increased (as compared with that of FIG. 5 to maintain the stitch density at a proper level.

It is noted, in connection with the embodiment of the invention described above, that the number of stitches forming the circular stitching part of a buttonhole is reduced as the thickness of a thread used is increased or conversely, the number of stitches is increased as the thread thread thickness is decreased. This arrangement perfectly prevents an excessively high or low thread density, i.e., prevents the semicircular stitching parts 98, 104 from being crowded with stitches or scanty of stitches due to variation in thread thickness, and thus assures fine and neat formation of those parts 98, 104. The same arrangement is further advantageous in that there is virtually no need to prepare a large number of cams corresponding to different thicknesses of threads and make cumbersome changes of the cams from one to another according to variation in thickness of the thread used.

In the above embodiment, the provision of the switch 88 and the decoder 90 which are operable by the button size selecting dial 36, will automatically adjust, according to a selected size of a button, the amount of lateral bight position of the needle 20 and the number of stitches when the semicircular and zigzag stitching parts 98, 104, 100 and 106 are sewn. For instance, an increase in the size of a button which means an increased length of the buttonhole pattern will increase the needle jogging amount and the number of stitches so that the buttonhole patterns are formed with a proper stitch density, that is, constant thread density and in proportion to a selected button size.

Another embodiment of the present invention will now be described with reference to FIG. 7. For convenience, the same reference numerals as used in the preceding figures will be used in FIG. 7 to identify the corresponding parts, the description of which is omitted.

Figure 7:
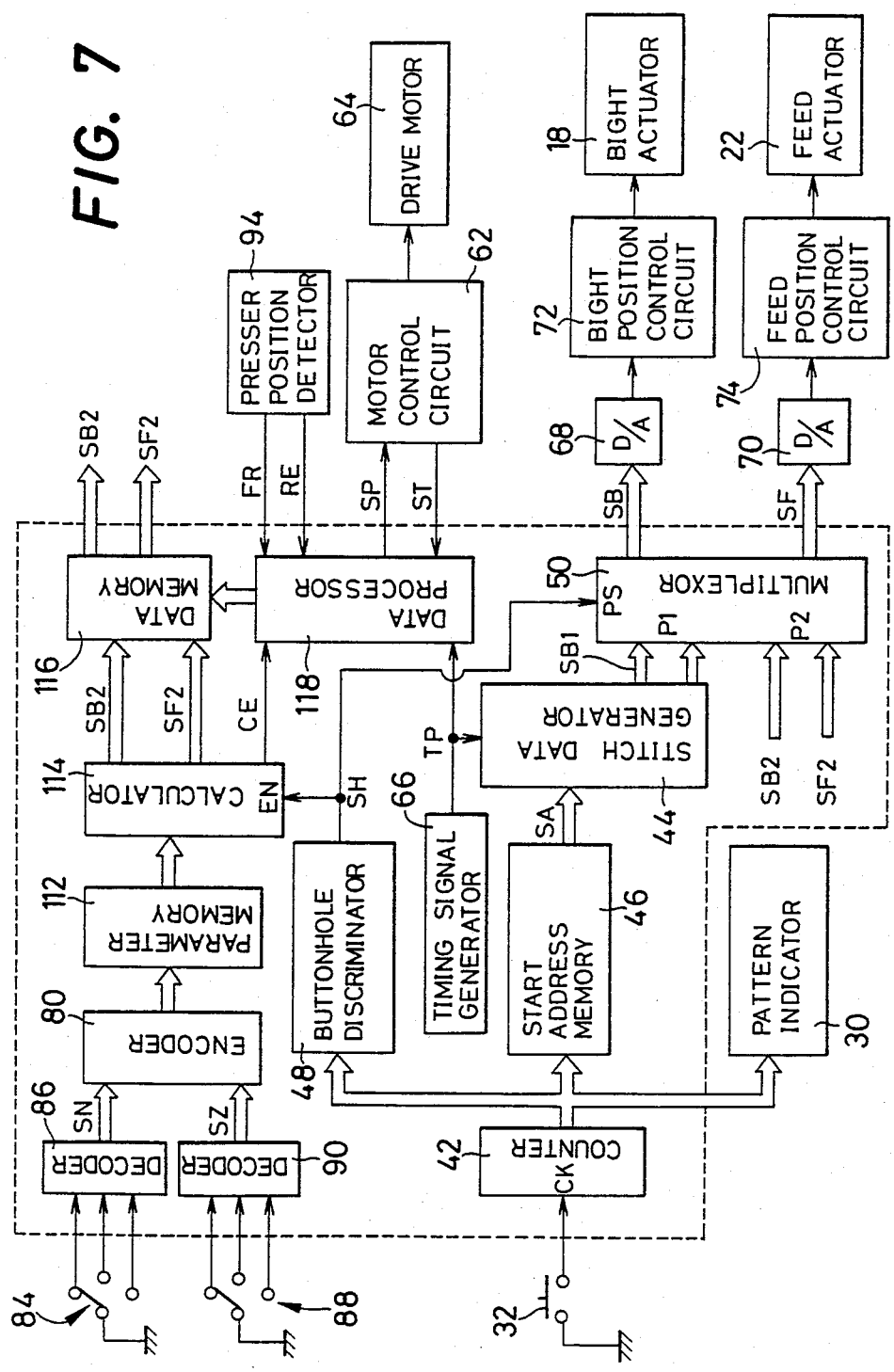
FIG. 7 is a diagram, corresponding to FIG. 2, representing a control circuit for another embodiment of the invention.

The stitch data generator 44 of this embodiment shown in FIG. 7 does not store any group of stitch data for forming buttonhole patterns having a circular stitching part. Instead, a calculator 114 will produce, through calculation, a group of stitch data necessary to form a buttonhole pattern. More specifically stated, the calculation of the stitch data by the calculator 114 is implemented according to parameters which are fed from a parameter memory 112. This memory 112 and the encoder 80 constitute means for designating a desired buttonhole. Those parameters are generated by the parameter memory 112 in response to signals representative of thread thicknesses and button sizes which are supplied from the encoder 80 upon manipulation of the selecting dials 34 and 36. BIGHT data SB2 and FEED data SF2 constituting a stitch data are fed to a data memory 116 which cooperates with the calculator 114 to form data generating means. Upon each calculation of a data, the calculator 114 feeds a CALCULATION END signal CE to a data processor 118 which, in response to the signal CE, designates memory locations within the data memory 116 in which the BIGHT and FEED data are stored.

The manner of preparation of stitch data by the calculator 114 will be explained with reference to the semicircular stitching parts 98, 104 of FIG. 4 by way of example. For calculation purpose, the calculator 114 maintains several functions which include: functions representative of interior and exterior circles 120 and 122, respectively; a function representative of a line 124 which is tangent to the exterior circle 122 and passes a point PA at the left rear (left upper in the figure) corner of the left side zigzag stitching part 100; a function representative of a line 126 which is tangent to the interior circle 120 and passes a point PB at the right rear corner of the stitching part 100; a function representative of a line 128 which is tangent to the interior circle 120 and passes a point PC at the left rear corner of the right side zigzaz stitching part 106; a function representative of a line 130 which is tangent to the exterior circle 122 and passes a point PD at the right rear corner of the stitching part 106. The numbers of stitches which are provided on the interior and exterior circles 120 and 122 are determined according to an arithmetic expression defined by parameters relating to a thread to be used. The positions of those stitches on the circles 120 and 122 are determined based on the above identified functions stored in the calculator 114 such that the stitches are equiangularly located. Similarly, the numbers of stitches on the tangent lines 124, 126, 128 and 130 are determined according to the arithmetic expression, and their positions are determined based on the stored functions such that the stitches are substantially equidistant from each other. The stitch positions thus obtained are stored in the data memory 116 in the form of stitch data.

In the case where the pattern selected by the pattern selecting button 32 is not a buttonhole pattern having a circular stitching part, no DISCRIMINATION signal SH is generated from the buttonhole discriminator 48 and consequently the multiplexor 50 selects its input port P1. The selected pattern is sewn, as previously described in association with the first embodiment, according to an appropriate group of stitch data stored in the stitch data generator 44.

When a buttonhole pattern having a circular stitching part is selected by the selecting button 32, on the other hand, the buttonhole discriminator 48 feeds the DISCRIMINATION signal SH to enable the calculator 114 to perform the calculation discussed above, and at the same time have the multiplexor 50 select its input port P2. Upon depression of the start-stop button 38 in this condition, the data processor 118 designates, in response to the TIMING signals TP, addresses of the data memory 116 from which sets of data SB2 and SF2 are sequentially read out to be fed through the multiplexer 50 to the digital-analogue converters 68 and 70. As a result, a buttonhole pattern shown in FIG. 4, 5, or 6 is formed according to the group of stitch data calculated by the calculator 114 based on the specific thickness of the thread used and the specific size of the button associated with the buttonhole involved. Since the number of stitches and the bight position of the needle 20 are automatically adjustable as mentioned before, the buttonhole patterns thus formed are given a constant thread density and a pattern width proportional to the button size thus presenting a neat appearance.

This alternative embodiment has, in addition to the same advantages as obtained in the previous embodiment, further advantages that there is no need to store in the ROM plural groups of buttonhole stitch data corresponding to various thread thicknesses and button sizes, which means reduction in memory capacity of the ROM and resultant saving of cost.

While the present invention has been described in its preferred embodiments, it is to be understood that the invention is not limited thereto but may be otherwise embodied.

It will be obvious, for example, that the components within a block of dashed lines in FIG. 2 or 7 are totally or partially provided in the form of a so-called microcomputer.

It will be appreciated in the embodiment of FIG. 7 that the START ADDRESS signal SA be supplied from the start address memory 46 to the encoder 80 so as to enable the calculator to work out groups of stitch data for forming other patterns of buttonholes which have a circular stitching part but are different in configuration from the eyelet-end buttonholes described hereinbefore.

It is to be understood that other changes and modifications may be made in the invention without departing from the scope of the appended claims.

What is claimed is:

1. An electronic sewing machine having actuating means for varying a relative position of a needle and a workpiece in accordance with stitch data which influences each stitch of a buttonhole, comprising:
    manual means for setting the thickness of thread;
    means for generating a thread code signal representative of the thread thickness set by said manual means;
    means responsive to said thread code signal for designating one of plural buttonholes each of which has a circular stitching part at its end and corresponds to each of different thicknesses of various threads to be used, said buttonholes being different in the number of stitches to be formed in said circular stitching part to maintain a constant thread density; and
    data generating means capable of selectively generating one of plural different groups of stitch data which respectively correspond to said plural buttonholes, said data generating means operating in timed relation with reciprocation of said needle for supplying said actuating means with each stitch data of the group corresponding to the designated buttonhole.

2. An electronic sewing machine according to claim 1, wherein said data generating means includes storage means for storing said plural different groups of stitch data, said designating means selecting one of said plural different groups in response to said thread code signal, said storage means supplying said actuating means with each stitch data of the selected group in timed relation with reciprocation of said needle.

3. An electronic sewing machine according to claim 1, wherein said designating means includes storage means for storing parameters which respectively correspond to said plural buttonholes and for generating one of said parameters in response to said thread code signal to designate one of said plural buttonholes, said data generating means including means for calculating stitch data related to each stitch in the circular stitching part of the designated buttonhole based on the parameter generated from said storage means.

4. An electronic sewing machine having actuating means for varying a relative position of a needle and a workpiece in accordance with stitch data which influences each stitch of a buttonhole, comprising:
    first manual means for setting a thickness of a thread;
    means for generating a thread code signal representative of the thread thickness set by said first manual means;
    second manual means for setting a size of a button;
    means for generating a size code signal representative on the button size set by said second manual means;
    means responsive to said thread code signal and said size code signal for designating one of plural buttonholes each of which has a circular stitching part at its end and corresponds to the combination of each of different thicknesses of various threads to be used and each of different sizes of various buttons, said buttonholes being different in the number of stitches to be formed in said circular stitching part and in the width of said circular stitching part to maintain a constant thread density and a constant proportion of the width to the length of said designated buttonhole; and
    data generating means capable of selectively generating one of plural different groups of stitch data which respectively correspond to said plural buttonholes, said data generating means operating in timed relation with reciprocation of said needle for supplying said actuating means with each stitch data of the group corresponding to the designated buttonhole.

5. A method of sewing, on an electronic sewing machine, a buttonhole which has a circular stitching part at one end thereof, the sewing machine having actuating means for varying a relative position of a needle and a workpiece in accordance with stitch data which influences each stitch of the buttonhole, the method comprising the steps of:
    selecting the thickness of a thread to be used for sewing the buttonhole;
    determining the number of stitches to be formed in said circular stitching part, according to the selected thickness of the thread so that said circular stitching part is provided with a constant thread density;
    preparing a group of stitch data which permits said circular stitching part to be formed with said determined number of stitches; and supplying said actuating means with said group of stitch data in timed relation with reciprocation of said needle.

6. A method according to claim 5, further comprising the steps of:
   selecting the size of a button which corresponds to the buttonhole to be formed; and
   determining the width of said circular stitching part according to the selected size of the button so that said circular stitching part is provided with a constant proportion of the width to the length of the buttonhole,
   said group of stitch data permitting said determined number of stitches to be positioned so that said circular stitching part is provided with said determined width.

* * * * *